United States Patent Office 3,708,469
Patented Jan. 2, 1973

3,708,469
2-THIOPYRIMIDINE NUCLEOSIDES
Helmut Vorbruggen and Peter Strehlke, Berlin, Germany, assignors to Schering AG, Berlin, Germany
No Drawing. Filed Sept. 15, 1969, Ser. No. 858,163
Claims priority, application Germany, Sept. 18, 1969,
P 17 95 357.0
Int. Cl. C07d 51/52
U.S. Cl. 260—211.5 R        25 Claims

ABSTRACT OF THE DISCLOSURE 2-thiopyrimidine nucleosides exhibiting cytotoxic, antiviral, enzyme-inhibiting as well as antihyperthyroid effects are obtained by a novel process comprising reacting a silyl compound of the formula

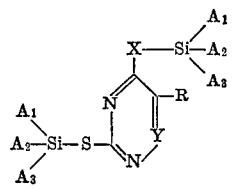

I with a masked halogen sugar and then splitting off the blocking groups, the final compounds being of the formula

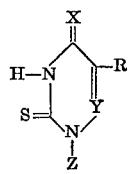

II wherein
X is O or NH,
Y is N or CH,
R is H, alkyl of 1–4 carbon atoms, halogen, nitro, nitrile, lower alkylamino lower alkoxy, or the group $$-(CH_2)_n-CO-A$$

wherein $n$ is O, 1 or 2 is O-alkyl of 1–5 carbon atoms, $NH_2$ or lower alkylamino, and
Z is a sugar residue,
and wherein in Formula I $A_1$, $A_2$ and $A_3$ represent lower alkyl.

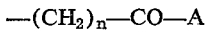

BACKGROUND OF THE INVENTION

This invention relates to 2-thiopyrimidine nucleosides.
Heretofore, a relatively complex procedure resulting in less than desired yields has been suggested for the preparation of certain 2-thiopyrimidine nucleosides [Chem. Pharm. Bull. 9 (1961) 709; 10 (1962) 308; Biochem. 7 (1968) 1427].

SUMMARY OF THE INVENTION

A principal object of the invention is to provide an improved process for the production of 2-thiopyrimidine nucleosides, as well as novel intermediates thereto.
Another object is to provide a class of novel 2-thiopyrimidine nucleosides of the Formula II with the provision that when Y is CH, R is other than hydrogen or methyl, as well as pharmaceutical compositions and uses based thereon.
Further objects and advantages of the invention will occur upon further study of the specification and appended claims.

To attain the above objects there is provided a process for the production of compounds of the general formula

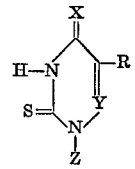

wherein
X represents an oxygen atom or an NH-group,
Y represents a nitrogen atom or a CH-group,
R represents a hydrogen atom, an alkyl group of 1–4 carbon atoms, halogen, a nitro group, a nitrile group, a lower alkylamino group, a lower alkoxy group; or the group $-(CH_2)_n-CO-A$, wherein $n$ is 0, 1 or 2, and A is an O-alkyl group of 1–5 carbon atoms, an amino group or a lower alkylamino group, and
Z represents a sugar residue, said process comprising:
(a) reacting a compound of the formula

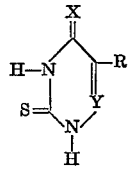

wherein X, Y and R have the above-indicated meanings, with a silylation reactant, suitable silylation reactants being compounds of the formula

wherein
$A_1$ to $A_3$ represent lower alkyl groups and
B represents a group, such as, for example, halogen, an acetamido group or a trimethylsilylamino group, optionally in the presence of a tertiary amine, to form the corresponding silyl compound;
(b) reacting the resultant silyl compound with a blocked halogen sugar in the presence of a Lewis acid to form a blocked $N_1$-nucleoside; and
(c) splitting off the blocking groups from this $N_1$-nucleoside in a conventional manner, and optionally converting an ester group on the heterocyclic 6-membered ring to an amido group.

The novel final products of this invention are those of the first mentioned general structural formula with the provision that when Y is CH, R is other than H or methyl.

The compounds produced in accordance with the process of this invention exhibit cytotoxic, antipsoriatic, antiviral, enzyme-inhibiting, as well as antihyperthyroid effects.

DETAILED DISCUSSION OF INVENTION

By the expression "lower" is meant from 1–4 carbon atoms.

The heterocyclic materials are 2-thiopyrimidines of the above mentioned structure, the synthesis of which is described in: The Chemistry of Heterocyclic Compounds/ The Pyrimidines, J. Wiley & Sons, 1962, and 3-thio-1,2,4-triazines, prepared by the methods described in: The Chemistry of Heterocyclic Compounds/The 1,2,3- and 1,2,3-Triazines, Tetrazines and Pentazines, Interscience Publishers, Inc. New York, 1956 pp. 78–84 and in Coll. Czech. Chem. Commun. 24 (1959) 2986.

The general reaction conditions for conducting the silylation reaction are described in: Silylation of Organic Compounds, Pierce Chemical Company, Rockford, Ill., 1968, pp. 18–26 and in Chem. Pharm. Bull. 12 (1964) 352 and Z. Chem. 4 (1964), 303.

As mentioned before, B is a leaving group, i.e., a group which readily cleaves as an anion.

Preferred specific silylation reactants include for example trimethylchlorosilane with bases as pyridine, triethylamine or other tertiary amines, or with ammonia; hexamethyldisilazane with an acid catalyst as trimethylchlorosilane, ammonium salts, sodium bisulfate; N-silylated amines like trimethylsilylmethylamine, trimethylsilylaniline, trimethylsilyldiethylamine, trimethylsilylimidazole, silylated amides like N, O-bis-trimethylsilylacetamide, N-trimethylsilyl-N, N'-diphenylurea and N-trimethylsilylphthalimide.

Novel silyl intermediates of this invention are of the following formula

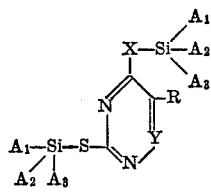

wherein X, R, Y, $A_1$, $A_2$ and $A_3$ have the previously indicated meanings.

Preferred specific silyl compounds other than those set forth in the examples include: 2-trimethylsilylthio-4-trimethylsilyloxy - 5 - carboxy - ethyl - pyrimidine, 2 - trimethylsilylthio - 4 - trimethylsilylamino - pyrimidine, 2-trimethylsilylthio - 4 - trimethylsilyloxy - 5 - ethoxypyrimidine, 2 - trimethylsilylthio - 4 - trimethylsilyloxy-5- propylpyrimidine.

The heterocyclic silyl compound is reacted in a solvent with blocked halogen sugar preferably in the presence of silver perchlorate between 0° C. and 60° C., preferably at room temperature. Preferred solvents are benzene or toluene, but other conventional solvents are also useful, e.g., chloroform, acetonitrile, nitromethane, dioxane or tetrahydrofuran.

Conventional blocking groups for halogen sugar are, for example, the benzoyl, toluyl and acetyl groups. The blocking groups can be split off, for example, by alcoholic solutions of ammonia or alcoholates. The function of the blocking group is to protect the hydroxyl groups during the reaction.

The halogen is preferably chloro or bromo and replaces the hemiacetalic OH-group of the sugar.

The method of preparing the halogenated blocked sugars is conventional, e.g., reacting the sugar with an alcohol in the presence of acid, protecting the free OH-groups with a suitable blocking group and forming the halogen-sugar by treatment with anhydrous, hydrogen halide in an organic solvent e.g. ether, acetic acid.

The protected halogenosugars are prepared by the methods described in W. W. Zorbach, R. S. Tipson: Synthetic Procedures in Nucleic Acid Chemistry, vol. 1, Interscience Publishers, 1968, or see in: Advances in Carbohydrate Chemistry, vol. 10, Academic Press, 1955 pp. 247–249, 251–253.

Preferred specific halogenated blocked sugars not mentioned elsewhere in this disclosure include:

2,3,5,6-tetra-O-benzoyl-D-allosylchloride,
2,3,5-tri-O-benzoyl-D-arabinosylbromide,
tetra-O-acetyl-β-D-fructopyranosylchloride,
tetra-O-acetyl-D-fructofuranosylchloride,
tetra-O-acetyl-β-D-galactofuranosylchloride,
tetra-O-acetyl-α-D-galactopyranosylchloride,
2,3,4,6-tetra-O-acetyl-glucopyranosylchloride,
2,3,5,6-tetra-O-acetyl-glucofuranosylchloride,
2,3,4-6-tetra-O-acetyl-α-D-mannopyranosylchloride,
2,3,4-tri-O-benzoyl-rhamnopyranosylchloride,
1,3,4,5-tetra-O-acetyl-sorbopyranosylchloride,
2,3,4-tri-O-acetyl-xylopyranosylchloride.

Especially preferred sugar residues Z include but are not limited to ribose, 2-deoxyribose, glucose, arabinose, allose, fructose, galactose, galactosamine, mannose, rhamnose, sorbose, xylose, glucosamine.

The fact that this modified Hilbert-Johnson reaction with blocked halogen sugars results in the formation of $N_1$-nucleosides is highly surprising, since in the literature (J. Am. Chem. Soc. 79 (1957), 6446) in analogous reactions, no N-nucleosides, but only O-glycosides were obtained. Furthermore, the novel process—in contrast to the processes known heretofore for the preparation of such compounds—produces the desired compounds in less steps and in very good yields. Therefore, the novel process provides a surprisingly simple way for the preparation of 2-thiopyrimidine nucleosides.

In addition to the novel final products described elsewhere in this disclosure, the following specific compounds are also preferred embodiments:

(1) 2-thio-5-carboxyethyl-cytidine, M.P. >200° C. (decomp.); -2',3',5'-tri-O-benzoate, M.P. 153–155° C.

(2) 1-β-D-glucopyranosyl-2-thio - 5 - carboxyethylcytosine M.P. 118–120° C. (decomp.); -2',3',4',6'-tetra-O-acetate, M.P. 139–141° C.

(3) 1-(β-D-2'-deoxy-ribofuranosyl) - 2 - thio-5-cyanocytosine-3',5'-di-O-toluylate, M.P. 138–140° C.

(4) 2-thio-6-azauridine-2',3',5'-tri-O-acetate, M.P. 76–80° C.

(5) 1-(β-D-ribopyranosyl)-2-thio - 6 - azauracil-2',3', 4'-tri-O-acetate. (Not yet crystalline.)

(6) 1-(β-D-glucopyranosyl)-2-thio - 6 - azauracil-2',3', 4',6'-tetra-O-acetate, M.P. 225° C.

The final products produced by this invention are especially useful for their antipsoriatic, antiviral, enzyme-inhibiting as well as antihyperthyroid effect.

The 2-thio-6-azauridine-tribenzoate, the corresponding triacetate, 1-(2',3',4',6'-tetraacetyl-D-glucopyranosyl)-2-thio-6-azauracil and 1-(2',3',4'-triacetyl-D-ribopyranosyl)-2-thio-6-azauracil have exhibited a cytostatic effect on oral administration against L 1210 leukemia in mice.

The antipsoriatic-effect of the above mentioned 2-thio-6-azauracil-derivatives can be demonstrated on oral administration as well as on topical administration, especially as a greasy ointment.

Because the compounds of this invention can be employed in vitro as well as in vivo, they are especially useful, as disinfectants, e.g., in the sterilization of medical instruments and the like, as well as in cleansing solutions for cleaning woodwork, towels, linen, blankets, dishes and the like, to prevent spread of infection.

The novel compounds of this invention can be employed in mixture with conventional pharmaceutical excipients. Carrier substances can be such organic or inorganic substances suitable for parenteral, enteral, or topical application, and which, of course, do not deleteriously react with the novel compounds, such as, for example, water, vegetable oils, polyethylene glycols, gelatin, lactose, amylose, magnesium stearate, talc, vaseline, cholesterol, etc.

For parenteral application, particularly suitable are solutions, preferably oily or aqueous solutions, as well as suspensions, emulsions or implants. Ampoules are convenient unit doages.

For enteral application, particularly suitable are tablets or dragees which are also characterized by talc and/or a carbohydrate carrier or binder or the like, the carbohydrate carrier being preferably lactose and/or corn starch and/or potato starch. A syrup or the like can also be used wherein a sweetened vehicle is employed.

For topical application, viscous to semi-solid forms are used such as liniments, salves, or creams, which are, if desired, sterilized, or mixed with auxiliary agents, such as preservatives, stabilizers, or wetting agents, or salts for influencing the osmotic pressure, or with buffer substances.

The substance of this invention is generally administered to animals, including, but not limited to, mammals and avians, e.g., cattle, cats, dogs, and poultry.

A daily dosage comprises about 0.1 to 20 g. active compound of this invention on oral administration and a 5% greasy ointment on topical administration. In general, the mg./kg. ratio is preferably about 1–2 to 225 mg. per kg. of body weight. The dose can be administered once per day or in increments throughout the day. In any case, the final compounds of this invention can be administered in the same manner as the known drug 6-aza-uridine-2′,3′,5′-triacetate.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

6.4 g. of 2-thiouracil is boiled under reflux with 130 ml. of hexamethyldisilazane, 1.5 ml. of trimethylchlorosilane and 50 ml. of dioxane for 16 hours. After distilling off all components boiling up to 120° C./760 mm., the residue is distilled in a bulb tube. Boiling point: 140° C./0.4 torr [mm. Hg]. Yield: 13.8 g. (quantitative) of 2-trimethylsilylthio-4-trimethylsilyloxypyrimidine.

6.8 g. of 2-trimethylsilylthio-4-trimethylsilyloxy-pyrimidine is dissolved in 80 ml. of absolute benzene and mixed with a solution of 12.1 g. of 1-chloro-2,3,5-tri-O-benzoyl-ribofuranose in 80 ml. of absolute benzene. Upon the addition of a solution of 5.2 g. of silver perchlorate in 100 ml. of absolute benzene, the solution assumes a yellow color, and a white precipitate of silver chloride is separated. After the mixture is allowed to stand for one hour at room temperature in darkness, it is extracted once each with saturated solutions of sodium bicarbonate, sodium thiosulfate and sodium chloride and, after drying, is concentrated by evaporation.

Yield: 15 g. of crude 2-thiouridine tribenzoate.

By extracting the crude product with boiling hexane (2× 300 ml., vestiges of reacted sugar are removed, thus obtaining 10.5 g. (73.5% of theory) of the product which though uniform according to thin-layer chromatography is not crystalline.

$[\alpha]_D^2 = -28.4°$ (c.=0.5 in chloroform) (c.=grams of solute per 100 ml. of solution).

3.5 g. of 2-thiouridine tribenzoate is dissolved in 250 ml. of ammonia-saturated methanol, and allowed to stand overnight. Then, the reaction mixture is evaporated under a vacuum, the residue is resolved in water/ethyl acetate, and the aqueous phase is then extracted six times with ether. After the aqueous phase has been evaporated, there is obtained 1.65 g. of crude 2-thiouridine (quantitative yield), which is recrystallized from ethanol/water.

Melting point: 214–215° C.
$[\alpha]_D = +39.3°$ (c.=0.5 in water).

EXAMPLE 2

10 g. of the ethyl ester of 2-thiouracil-5-acetic acid, 100 ml. of hexamethyldisilazane and 1.5 ml. of trimethylchlorosilane are boiled under reflux for 2 hours. The working-up procedure is conducted as described in Example 1. The ethyl ester of 2-trimethylsilylthio-4-trimethylsilyloxy-pyrimidine-5-acetic acid boils at 170° C. at a pressure of 0.1 torr; yield: 14.8 g. (88% of theory).

5.38 g. of the ethyl ester of 2-trimethylsilylthio-4-trimethylsilyloxypyrimidine-5-acetic acid and 7.22 g. of 1-chloro - 2,3,5-tri-O-benzoylribofuranose in 60 ml. of absolute benzene are mixed with 3.11 g. of silver perchlorate in 30 ml. of absolute benzene. The reaction mixture is stirred for 15 minutes at room temperature and is then worked up as set forth in Example 1. The yield is 10.5 g. From acetone/cyclohexane there is crystallized 7.8 g. (78% of theory) of 2-thiouridine-5-acetic acid-ethyl-ester tribenzoate. Melting point: 118–120° C.
$[\alpha]_D = -83°$ (c.=0.5 in chloroform).

(a) 3.3 g. of 2-thiouridine-5-acetic acid-ethyl-ester tribenzoate is dissolved in 250 ml. of absolute methanol and allowed to stand overnight at room temperauture with 5.25 ml. of 1-molar sodium methylate solution. After neutralizing with "Dowex 50" (H⊕ form), the solvent is evaporated under a vacuum, and the remainder is resolved in ethyl acetate/water. The aqueous phase is extracted twice with ethyl acetate. The aqueous solution is treated with charcoal, filtered, evaporated, and the residue is crystallized from methanol/water (4:1). Yield: 1.18 g. (74% of theory) of the methyl ester of 2-thiouridine-5-acetic acid; M.P. 195–197° C.
$[\alpha]_D = +19.8°$ (c.=0.5 in water).

(b) 500 mg. of 2-thiouridine-5-acetic acid-ethyl-ester tribenzoate is dissolved in 40 ml. of a concentrated aqueous ammonia solution and agitated for 16 hours at 24° C. The solution is evaporated, and the residue is recrystallized from methanol, thus obtaining 165 mg. (68% of theory) of 2-thiouridine-5-acetic acid amide, M.P. 217–218° C.

EXAMPLE 3

10 g. of 5-ethyl-2-thiouracil is boiled with 100 ml. of hexamethyldisilazane and 2 ml. of trimethylchlorosilane for 2 hours under reflux. After conducting a working-up process as described in Example 1, there is obtained 17.5 g. of 2-trimethylsilylthio-4-trimethylsilyloxy-5-ethylpyrimidine, B.P. 120° C./0.01 torr.

4.7 g. of 2 - trimethylsilylthio - 4-trimethylsilyloxy-5-ethylpyrimidine is stirred for 30 minutes at room temperature with 6 g. of 1-chloro-3,5-O-p-toluyl-2-deoxyribofuranose and 3.7 g. of silver perchlorate in 100 ml. of benzene. After working up the reaction mixture as set forth in Example 1, 7.1 g. of crude product is obtained (81% of theory).

By fractional crystallization from ethyl acetate, the β-anomer is obtained, M.P. 199–202° C.; $[\alpha]_D = -82.5°$ (c.=0.5 in chloroform); as well as the α-anomer (crystallized from acetone), M.P. 164–166° C.; $[\alpha]_D = +6°$ (c.=0.5 in chloroform), of 2-thio-5-ethyl-2′-deoxyuridine ditoluate.

(a) 450 mg. of the pure β-anomer is allowed to stand with 80 ml. of ammonia-saturated methanol for 48 hours at room temperature. The reaction mixture is evaporated; the thus-remaining oil is shaken with ether until the nucleoside is completely ctystalline. The separated crystalline product is recrystallized from acetone/ether; yield: 180 mg. (75% of theory. 2-thio-5-ethyl-2′-deoxyuridine melts at 187–188° C.; $[\alpha]_D = +6.5°$ (c.=0.5 in methanol).

EXAMPLE 4

5 g. of 2-trimethylsilylthio-4-trimethylsilyloxy-5-ethylpyrimidine, prepared as described in Example 3, is heated with 5.72 g. of acetobromoglucose and 3.8 g. of silver perchlorate in 150 ml. of toluene for 75 minutes to 60° C. and is then worked up as set forth in Example 1, thus obtaining 6.1 g. (85% of theory) of 2-thio-5-ethyl-1-β-D-tetra-acetylglucopyranosyl uracil, which though uniform according to thin-layer chromatography, is not crystalline. After saponification as indicated in Example 1, 2-thio-5-ethyl-1-β-D-glucopyranosyl uracil is obtained in a quantitative yield, which compound is likewise non-crystalline.

After treatment with pyridine/benzoyl chloride, crystalline 2-thio-5-ethyl-1-β-D-glucopyranosyl-uracil tetrabenzoate is obtained in an 80% yield, M.P. 156–157° C.; $[\alpha]_D = +98.5°$ (c.=0.5 in chloroform).

EXAMPLE 5

5.2 g. of 2-thio-6-azauracil, 100 ml. of hexamethyldisilazane and 1.5 ml. of trimethylchlorosilane yield, after boiling for 1 hour under reflux and working up as described in Example 1, 3-trimethylsilylthio-5-trimethylsilyloxy-1,2,4-triazine in a quantitative yield, B.P. 120° C./0.1 torr.

11 g. of 3 trimethylsilylthio-5-trimethylsilyloxy-1,2,4-triazine, 20 g. of 1-chloro-2,3,5-tri-O-benzoylribofuranose and 12 g. of silver perchlorate in 200 ml. of benzene are stirred overnight. The reaction mixture is worked up as set forth in Example 1, thus obtaining 18.5 g. (78% of theory) of crystalline 2-thio-5-azauridine tribenzoate; recrystallized from a small amount of chloroform and ethanol, this compound has a melting point of 173° C.; $[\alpha]_D = -35.5°$ (c.=0.5 in chloroform).

12 g. of 2-thio-5-azauridine tribenzoate is saponified, as described in Example 1, with 1.2 l. of ammonia-saturated methanol, thus obtaining 4.6 g. (85% of theory) of a crude product. After recrystallization from ethanol, 3.7 g. of crystalline 2-thio-6-azauridine is obtained (67% of theory); M.P. 197.5° C.; $[\alpha]_D = -96.6°$ (c.=0.5 in water).

EXAMPLE 6

18 g. of 2-thiothymine (1) is boiled under reflux for 20 hours with 200 ml. of hexamethyldisilazane (HMDS) and 10 ml. of trimethylchlorosilane. Under normal pressure, the main quantity of HMDS is first distilled off; then, the remainder of HMDS is removed at 100° C./15 torr, and the residue is distilled in a bulb tube at 120° C./0.02 torr, thus obtaining 34.6 g. (95.5% of theory) of 2-trimethylsilyl-thio-4-trimethylsilyloxy - 5 - methylpyrimidine (2).

Under cooling with ice, 22.6 g. of silver perchlorate, dissolved in 350 ml. of benzene, is added all at once to a mixture of 34.6 g. of (2) in 250 ml. of benzene and 42.2 g. of 1-α-chloro-3,5-di-O-p-toluyl-2-deoxyribofuranose (3) in 250 ml. of benzene (does not dissolve completely); the solution, which at first is turbid, becomes clear. After about 10 minutes, the separation of silver chloride commences. After stirring for one hour in darkness, the solution is introduced into saturated sodium bicarbonate solution and shaken until it is neutralized. Without waiting for the phase separation, approximately 200 ml. of saturated sodium thiosulfate solution is added thereto; the reaction mixture is again shaken, and the phases are separated. The organic phase is shaken with saturated sodium chloride solution, dried, and evaporated. The already crystalline crude product is dissolved in a mixture of 350 ml. of methanol and 150 ml. of acetone and stored overnight in a refrigerator. The thus-separated crystals (11.6 g.=22%) melt at 197–201° C. and are almost purely β-anomeric 2-thiothymidine ditoluate (4). The mother liquor is evaporated and then dissolved under heating in about 250 ml. of methanol and 50 ml. of ethyl acetate. During the gradual cooling step, 15.5 g. (29%) of the α-anomer separates in crystal form; M.P. 182–184° C.

Analysis

α-Anomer—Calculated (percent): C, 63.1; H, 5.26; N, 5.66; S, 6.47. Found (percent): C, 63.0; H, 5.33; N, 5.67; S, 6.73. $[\alpha]_D = +2.8°$ (c.=0.5 in chloroform).

β-Anomer—Found (percent): C, 62.9; H, 5.34; N, 5.80; S, 6.71. $[\alpha]_D = -96.8°$ (c.=0.5 in chloroform).

The pure α- and β-anomer each are allowed to stand 2 days at room temperature with 175 times the amount of ammonia-saturated methanol; then, the respective reaction mixture is evaporated under a vacuum, decanted twice with ether, and the oily residue is crystallized. A 62% yield of α-2-thiothymidine, M.P. 152–153° C. is obtained ($[\alpha]_D = 51.5°$, c.=0.58 in methanol); the β-anomer is produced in a yield of 82% (M.P. 182–183° C., $[\alpha]_D = +16°$, c.=0.5 in methanol).

EXAMPLE 7

In a sodium ethylate solution, freshly prepared from 7.55 g. of sodium and 205 ml. of ethanol, there is dissolved 24.9 g. of thiourea. In the course of 40 minutes, 40 g. of ethoxymethylenemalononitrile (maintained in the liquid phase by gentle heating) is added thereto, and the reaction mixture is boiled under reflux for 6 hours. Thereafter, 575 ml. of water is added; the solution is acidified with 60 ml. of glacial acetic acid, and boiled for 5 minutes. The thus-precipitated crystals are vacuum-filtered after cooling of the solution. 57 g. (98%) of 2-thio-5-cyanocytosine (7) is obtained. The compound exhibits a yellow color and can be recrystallized from dimethyl formamide/water.

10 g. of (7) are ground with a motar and pestle and boiled under reflux for 24 hours with 500 ml. of dioxane/hexamethyl-disilazane (1:1) and 1 g. of ammonium sulfate. An oil is obtained (13.5 g., 70%) which readily crystallizes, constituting 2-trimethyl-silylthio-4-trimethylsilylamino-5-cyanopyrimidine (8).

A solution of 15.2 g. of (8) and 24.7 g. of 1-chloro-2,3,5-tri-O-benzoylribofuranose (9) in 300 ml. of benzene is mixed with 10.7 g. of silver perchlorate, dissolved in 100 ml. of benzene, at room temperature. A thick percipitate is produced which is stirred for 2 hours, and then 200 ml. of ethyl acetate is added and the reaction mixture worked up in the usual manner, thus obtaining 30.2 g. of crude 2-thio-5-cyanocytidine tribenzoate (10). The product is dissolved in a small amount of methylene chloride and precipitated with a large amount of ether. 20 g. of an amorphous substance precipitates, which is crystallized from acetone/cyclohexane. The crystals melt at 141–144° C. ($[\alpha]_D = -50.7°$).

3 g. of (10) is dissolved in 90 ml. of methanol and reacted with 7.5 ml. of 1-molar sodium methylate solution. The reaction mixture is allowed to stand for 3 hours at room temperature, concentrated to half its volume at 30° C., and the solution is allowed to stand overnight in a refrigerator; 1.12 g. of crystals separate, which crystals have a melting point of 192–195° C.

Analysis 2-thio-5-cyanocytidine ($C_{10}H_{12}N_4O_4S \cdot CH_3OH$).—Calculated (percent): C, 41.8; H, 5.06; N, 17.7; S, 10.10. Found (percent): C, 42.2; H, 5.50; N, 17.4; S, 9.85.

EXAMPLE 8

A mixture of 206 g. of the methyl ester of methoxyacetic acid and 222 g. of the ethyl ester of formic acid is added dropwise within 8 hours to an ice-cooled suspension of 120 g. of sodium hydride in oil (50%). The reaction mixture is stored overnight in a refrigerator; then, 1 l. of ice water is added, the solution is shaken out with ether, and the aqueous phase is acidified under strong cooling with dilute sulfuric acid (1:1). The product is extracted with ether; the ether phase is washed with potassium bicarbonate solution, dried, and evaporated; the residue is fractionated, thereby obtaining 66.4 g. of formylmethoxyethyl acetate.

40 g. of formyl-methoxyethyl acetate and 42 g. of potassium carbonate are added to a hot solution of 23.2 g. of thiourea in 34 ml. of water. After stirring for 2 hours, 200 ml. of water is added. The mixture is brought to a pH of 3 with concentrated hydrochloric acid, and the thus-precipitated substance is vacuum-filtered, resulting in 32 g. (74%) of 5-methoxy-2-thiouracil which, after recrystallization from water, melts at 270° C. with decomposition.

7 g. of 5-methoxy-2-thiouracil, 70 ml. of hexamethyldisilazane and 2 ml. of trimethylchlorosilane are boiled under reflux for 20 hours. At normal pressure, all readily boiling substances are first distilled off (up to 125° C.). The remainder is freed of readily boiling residues by means of a water-jet aspirator at a water bath temperature e.g. of 100° C., and is then distilled in a bulb tube at 0.05 torr and 140° C. There is obtained 13.2 g. of crystalline 2 - trimethylsilylthio-4-trimethylsilyloxy-5-methoxypyrimidine, M.P. 64–65° C.

13 g. of 2-trimethylsilylthio-4-trimethylsilyloxy-5-methoxy-pyrimidine in 50 ml. of benzene, 20 g. of 1-chloro-2,3,5-tribenzoyl-ribofuranose in 50 ml. of benzene and 9 g. of AgClO₄ in 150 ml. of benzene are stirred for 2 hours at room temperature. The solution is at first clear and greenish, and later yellowish. After about 5 minutes, the separation of silver chloride commences. 300 ml. of ethyl acetate is added, and the reaction mixture is shaken to neutral with potassium bicarbonate. Then, saturated sodium thiosulfate solution is added, and the reaction mixture shaken once again. A thus-formed emulsion is separated by filtration over kieselgur. The organic phase is then shaken twice with NaCl solution, dried, boiled with charcoal, and evaporated, thus obtaining 22 g. of an almost colorless oil. The latter is dissolved in 20 ml. of chloroform and mixed with 150 ml. of hexane. This procedure is repeated with the precipitated substance, and 19 g. (73%) of 5-methoxy-2-thiouridine tribenzoate is thus obtained as a colorless resin; according to the thin-layer chromatogram (mobile phase: ether), this resin is practically uniform.

2.6 g. of the oily 5-methoxy-2-thiouridine tribenzoate, is stirred overnight in 100 ml. of ammonia-saturated methanol. The reaction solution is exaporated under a vacuum, and the residue is shaken with ethyl acetate to crystallize out 5-methoxy-2-thiouridine. The reaction mixture is filtered and 800 mg. of crystals are recovered. Another 100 mg. of crystals is recovered from the ethyl acetate after allowing the reaction mixture to stand overnight. The total yield is 92%. After recrystallization from ethanol, the compound melts at 221–222° C.

Analysis ($C_{10}H_{14}N_2O_6S$).—Calculated (percent): C, 41.4; H, 4.82; N, 9.65; S, 11.0. Found (percent): C, 41.3; H, 4.99; N, 9.68; S, 11.5. $[\alpha]_D^{24} = +18.2°$ (c.=0.5 in $H_2O$).

EXAMPLE 9

20 g. of 2-thio-5-methyl-6-azauracil is boiled under reflux for 2 hours with 200 ml. of HMDS and 10 ml. of trimethylchlorosilane. After working up the reaction mixture analogously to Example 6, 38.7 g. (97%) of 3-trimethylsilylthio-5-trimethylsilyloxy - 6 - methyl-1,2,4-triazine (18) is obtained as an intensely yellow oil having a boiling point of 160° C./0.2 torr.

28.7 g. of (18), 50 g. of 1-chloro-2,3,5-tri-O-benzoyl-ribofuranose and 20.7 g. of silver perchlorate are reacted in 400 ml. of benzene. After 30 minutes of reaction, the solution is allowed to stand overnight (+4° C.) and is worked up analogously to Example 7. 77 g. of a crude product is thus obtained which is almost uniform according to thin-layer chromatography in the system chloroform/10% isopropanol and crystallizes in part after being allowed to stand for one week without any solvent. The product is triturated with benzene thus obtaining 8.8 g. of colorless crystals of 2-thio-5-methyl-6-azauridine tribenzoate (19); these crystals, after recrystallization from benzene/methanol, melt at 151–154° C.

20 g. of the oily tribenzoate (19) is stirred overnight at room temperature with 600 ml. of ammonia-saturated methanol. The dark-brown solution is evaporated and distributed in ether/water. The dark, greasy product which precipitates is dissolved in methylene chloride/methanol and mixed with a large amount of ether and water. The aqueous phases are combined and then extracted twice with ether and ethyl acetate, and thereafter evaporated. 7.5 g. (80%) of a yellow product is obtained. From ethanol, 0.8 g. of an amorphous substance is first obtained, and then there crystallizes 1.5 g. of 2-thio-5-methyl-6-azauridine (16%), melting, after recrystallization from methanol, at 218–220° C.

Analysis

Calculated (percent): C, 39.3; H, 4.73; N, 15.3; S, 11.6. Found (percent): C, 39.7; H, 4.99; N, 14.9; S, 11.2. $[\alpha]_D = -84.2°$ (c.=0.5 in methanol).

EXAMPLE 10

30.6 g. of oxalacetic acid-ethyl-ester thiosemicarbazone is suspended in 500 ml. of ethanol and mixed with 2 equivalents of 1 N ethanolic KOH. After 5 minutes at room temperature, the solution is adjusted to a pH of about 3 with concentrated hydrochloric acid, and the solution is evaporated. The residue is boiled with ethyl acetate and filtered hot. Then, the ethyl acetate is removed by evaporation, and the residue is recrystallized from water, thus obtaining 20 g. (80%) of the ethyl ester of 6-aza-2-thio-uracil-5-acetic acid (20) having a melting point of 186–188° C.

10 g. of (20) is boiled under reflux for 1 hour with 100 ml. of HMDS and 1 ml. of trimethylchlorosilane. After conducting a working up step, 12.9 g. (77%) of the ethyl ester of 3 - tetramethylsilylthio - 5 - trimethyl-silyloxy - 1,2,4 - triazine - 6 - acetic acid (21) is obtained as a colorless oil having a boiling point of 140° C./0.01 torr.

19.1 g. of (21), 23 g. of 1 - chloro - 2,3,5-tri-O-benzoyl-ribofuranose and 14.5 g. of silver perchlorate are reacted in 400 ml. of benzene (reaction time 1 hour). After working up to reaction product as described in Example 7, 32 g. of 2 - thio - 6 - azauridine - 5 - acetic - acid-ethyl-ester tribenzoate (22) is obtained as a crude product, which is practically uniform with respect to thin-layer chromatography, but is not crystalline. The yield is quantitative.

21 g. of (22) is allowed to stand for 24 hours with one l. of 0.1-molar sodium methylate in methanol. Then, the reaction solution is neutralized with dilute methanolic sulfuric acid; the sodium sulfate is filtered off; the reaction mixture is evaporated; and the residue is distributed into water/ether. The aqueous phases are then extracted twice with ether, and then evaporated under vacuum. The crude product is dissolved in 50 ml. of water, filtered over 30 g. of "Dowex 50" ($H^\oplus$) (elution with 250 ml. of water), and the brown solution is decolorized with charcoal and evaporated. The substance is first recrystallized from acetonitrile and then from ethanol, resulting in 4 g. (38%) of the methyl ester of 2-thio-6-aza-uridine-5-acetic acid, M.P. 127–129° C.

The preceding examples can be repeated with similar success by substituting the generically or specifically described reactant and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the preparation of an $N_1$-nucleoside of the formula

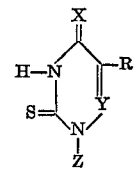

wherein X is O or NH, Y is N or CH, R is H, alkyl of 1–4 carbon atoms, halogen, nitro, nitrile, lower alkylamino, lower alkoxy, or the group —($CH_2$)$_n$—CO—A wherein n is 0, 1 or 2 and A is an O-alkyl group of 1–5 carbon atoms, $NH_2$, or lower alkylamino, and Z is a monosaccharide group, said process comprising reacting a compound of the formula:

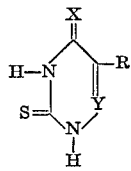

wherein X, Y and R have the previously indicated meanings, with a silylation reactant of the formula:

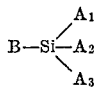

wherein $A_1$ to $A_3$ are lower alkyl groups, and B is halogen, acetamido or trimethylsilylamino, to form a silyl compound of the formula

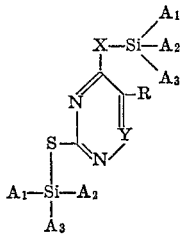

wherein X, R, Y, $A_1$, $A_2$ and $A_3$ have the previously indicated meanings; reacting said silyl compound with a protected halogen sugar in the presence of silver perchlorate to obtain a protected $N_1$-nucleoside;

splitting off the protected groups to form said $N_1$-nucleoside; and recovering said $N_1$-nucleoside from the reaction medium.

2. A process according to claim 1 wherein $A_1$, $A_2$ and $A_3$ each are methyl.

3. A process according to claim 2 wherein B is $(CH_3)_3SiNH-$.

4. A process according to claim 2 wherein B is Cl.

5. A compound selected from the group consisting of:
2-thio-6-azauridine;
2-thio-5-methyl-6-azauridine;
2-thio-6-azauridine-5-acetic acid methyl ester;
2-thio-6-azauridine-2',3',5'-tri-O-acetate;
1-($\beta$-D-ribopyranosyl)-2-thio-6-azauracil-2',3',4'-tri-O-acetate;
1-($\beta$-D-glucopyranosyl)-2-thio-6-azauracil-2',3',4',6'-tetra-O-acetate.

6. A compound selected from the group consisting of:
2-thiouridine-5-acetic acid;
2-thio-5-ethyl-2'-deoxyuridine;
2-thio-5-ethyl-1-$\beta$-D-glucopyranosyl-uracil;
5-methoxy-2-thiouridine;
2-thiouridine-5-acetic acid amide.

7. A compound selected from the group consisting of:
2-thio-5-cyanocytidine;
2-thio-5-carboxyethyl-cytidine;
2-thio-5-carboxyethyl-cytidine-2',3',5'-tri-O-benzoate;
1-$\beta$-D-glucopyranosyl-2-thio-5-carboxyethyl-cytosine;
1-$\beta$-D-glucopyranosyl-2-thio-5-carboxyethyl-cytosine-2',3',4',6'-tetra-O-acetate;
1-($\beta$-D-2'-deoxy-ribofuranosyl)-2-thio-5-cyano-cytosine-3',5'-di-O-p-toluylate.

8. A compound as defined by claim 5 wherein said compound is 2-thio-6-azauridine.

9. A compound as defined by claim 5 wherein said compound is 2-thio-5-methyl-6-azauridine.

10. A compound as defined by claim 5 wherein said compound is 2-thio-6-azauridine-5-acetic acid methyl ester.

11. A compound of claim 5, 2-thio-6-azauridine-2',3',5'-tri-O-acetate.

12. A compound of claim 5, 1-($\beta$-D-ribopyranosyl)-2-thio-6-azauracil-2',3',4'-tri-O-acetate.

13. A compound of claim 5, 1-($\beta$-D-glucopyranosyl)-2-thio-6-azauracil-2',3',4',6'-tetra-O-acetate.

14. A compound as defined by claim 6 wherein said compound is the methyl ester of 2-thiouridine-5-acetic acid.

15. A compound as defined by claim 6 wherein said compound is 2-thio-5-ethyl-2'-deoxyuridine.

16. A compound as defined in claim 6 wherein said compound is 2-thio-5-ethyl-1-$\beta$-D-glucopyranosyl-uracil.

17. A compound of claim 6, 2-thio-5-carboxyethyl-cytidine.

18. A compound of claim 6, 2-thio-5-carboxyethyl-cytidine-2',3',5'-tri-O-benzoate.

19. A compound of claim 6, 1-$\beta$-D-glucopyranosyl-2-thio-5-carboxyethyl-cytosine.

20. A compound of claim 6, 1-$\beta$-D-glucopyranosyl-2-thio-5-carboxyethyl-cytidine-2',3',4',6'-tetra-O-acetate.

21. A compound of claim 6, 1-($\beta$-D-2'-deoxy-ribofuranosyl)-2-thio-5-cyanocytosine-3',5'-di-O-p-toluylate.

22. A compound as defined by claim 6 wherein said compound is 5-methoxy-2-thiouridine.

23. A compound as defined by claim 6 wherein said compound is 2-thiouridine-5-acetic acid amide.

24. A compound as defined by claim 7 wherein said compound is 2-thio-5-cyanocytidine.

25. 2-thio-thymidine.

References Cited

UNITED STATES PATENTS

| | | | |
|---|---|---|---|
| 3,208,997 | 9/1965 | Iwai et al. | 260—211.5 |
| 3,352,849 | 11/1967 | Shen et al. | 260—211.5 |
| 3,354,160 | 11/1967 | Duschinsky et al. | 260—211.5 |
| 3,463,850 | 8/1969 | Shen et al. | 260—211.5 |
| 3,493,559 | 2/1970 | Hunter | 260—211.5 |

LEWIS GOTTS, Primary Examiner

J. R. BROWN, Assistant Examiner

U.S. Cl. X.R.

424—180

UNITED STATES PATENT OFFICE
CERTIFICATE OF CORRECTION

Patent No. 3,708,469  Dated January 2, 1973

Inventor(s) HELMUT VORBRUGGEN ET AL.

It is certified that error appears in the above-identified patent and that said Letters Patent are hereby corrected as shown below:

COLUMN 1, IN THE HEADING: "Claims priority, application Germany, September 18, 1969", the date should read -- September 18, 1968 --.

COLUMN 2, line 40: After "a", insert -- leaving --.

COLUMN 2, line 69: "1,2,3-Triazines", should read --1,2,4-Triazines --.

COLUMN 12, CLAIM 20: "cytidine" should read -- cytosine --.

Signed and sealed this 20th day of November 1973.

(SEAL)
Attest:

EDWARD M. FLETCHER, JR.　　　　RENE D. TEGTMEYER
Attesting Officer　　　　　　　　Acting Commissioner of Patents